Nov. 10, 1953

J. J. ARPS 2,658,725

SIGNAL TRANSMISSION SYSTEM FOR USE
IN LOGGING DRILL HOLE FORMATIONS

Filed Oct. 31, 1947

INVENTOR.
Jan Jacob Arps

BY

Attys.

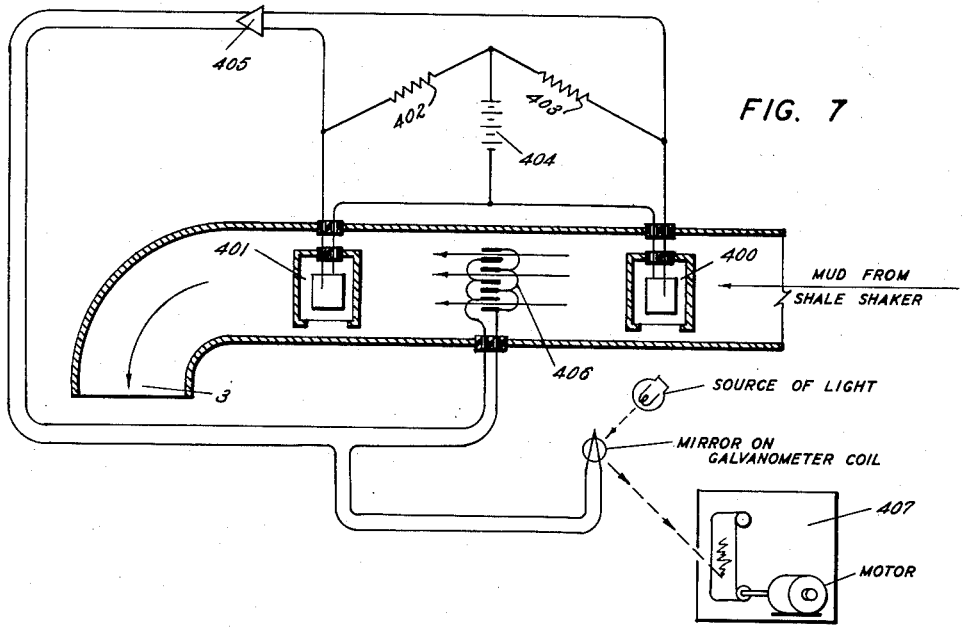

Nov. 10, 1953

J. J. ARPS
SIGNAL TRANSMISSION SYSTEM FOR USE
IN LOGGING DRILL HOLE FORMATIONS 2,658,725

Filed Oct. 31, 1947

INVENTOR.
Jan Jacob Arps
BY *Mason and Wyos*
Attys.

Patented Nov. 10, 1953

2,658,725

UNITED STATES PATENT OFFICE 2,658,725

SIGNAL TRANSMISSION SYSTEM FOR USE IN LOGGING DRILL HOLE FORMATIONS

Jan Jacob Arps, Tulsa, Okla.

Application October 31, 1947, Serial No. 783,280

20 Claims. (Cl. 255—1)

The present invention relates to methods and apparatus for transmitting signals from one point to another through a fluid medium and more particularly to an improved method and improved apparatus for transmitting signals from a point in a bore hole to the surface of the earth.

It is the customary practice in making electrical logs of the formations traversed by bore holes to first drill the hole, then remove the drilling equipment, and then lower into the bore hole a suitable arrangement of electrodes suspended from an electrical cable. In this sequence of operations, the necessity for interruption of the drilling operation and removal of the drilling tools from the bore hole constitutes an undesirable feature.

Although a few systems have been proposed for making certain electrical measurements in bore holes while the drilling is in progress, such methods involve the extension of an insulated electrical conductor from the surface of the earth down the bore hole, usually inside of the drill pipe, for connection to an electrode on or near the drill bit. The apparatus involved usually includes a source of current and indicating apparatus located at the earth's surface and suitably connected to the insulated conductor and to an electrode grounded in the surface of the earth. The difficulties involved in installing and maintaining such insulated conductors in operable condition have discouraged the use of this method. In another system it has been proposed to eliminate the insulated electrical conductor and to employ the entire drilling tool as one electrode, and a remote surface ground as the other electrode. Electrical measurements are then made between the two electrodes by means of measuring apparatus provided at the earth's surface. It has been found, however, that such a system is not practical because the drilling tool is in electrical contact with the earth through the drilling mud for substantially the entire length of the drilling tool and for this reason the indications or records made by the measuring apparatus necessarily comprise the resultant electrical effect caused by all of the strata traversed by the drilling tool. In such a system, the deeper the drill bit penetrates into the earth the smaller will be the proportion of the total current flowing between the earth and the drill bit, and consequently the less representative the record will be of the geological formation in the immediate vicinity of the drill bit.

It is a general object of the present invention, therefore, to provide an improved system and method which makes it possible to obtain logs of bore holes in the earth without the necessity for electrical connections extending from the surface of the earth to the position in the well where the nature of the formation is being investigated.

According to another object of the invention, the indication and/or recording of the nature of the geological formations traversed by a bore hole is accomplished simultaneously with the drilling operation, with substantially the same accuracy provided by presently employed processes which require the withdrawal of the drilling tools from the bore hole.

It is a further object of the invention to provide a device which is capable of electrically logging a bore hole simultaneously with the drilling thereof, thereby not only eliminating the necessity for removing the drilling equipment and replacing it with the logging equipment, but also providing a means whereby an operator may tell at all times the nature of the formation through which he is drilling instead of having to wait until the hole has been completed before obtaining this information.

It is still another object of the invention to provide a well logging system capable of being used during drilling operations and by means of which it is possible to log a characteristic of the formation shortly after it has been exposed by the drill and before there is a substantial contamination by penetration of drilling fluid.

Another object of the invention is to provide means whereby information relating to the electrical and other characteristics of the formation surrounding the hole being drilled may be communicated to the surface of the ground without the necessity for electrical conductors or other special transmitting channels extending from the bottom to the top of the hole.

The invention, both as to its organization and method of operation, together with further objects and advantages thereof, will best be understood by reference to the following specification, taken in connection with the accompanying drawings in which.

Figure 6:
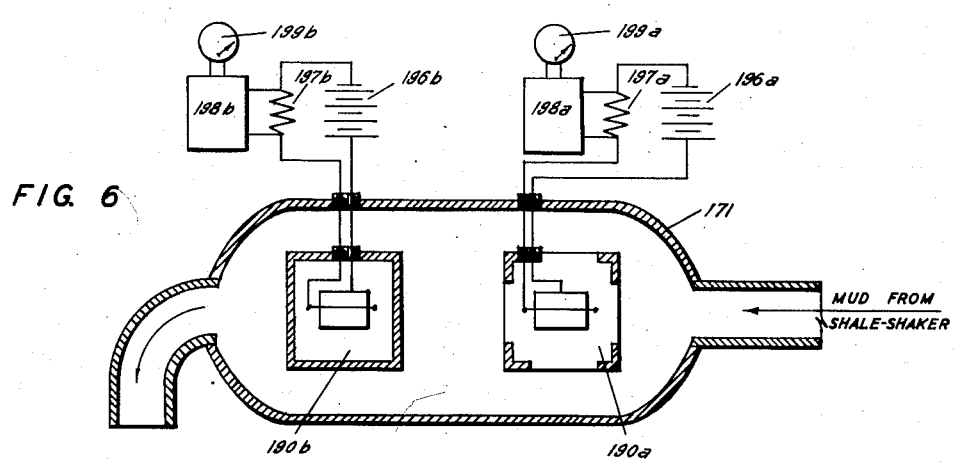
Figure 5:
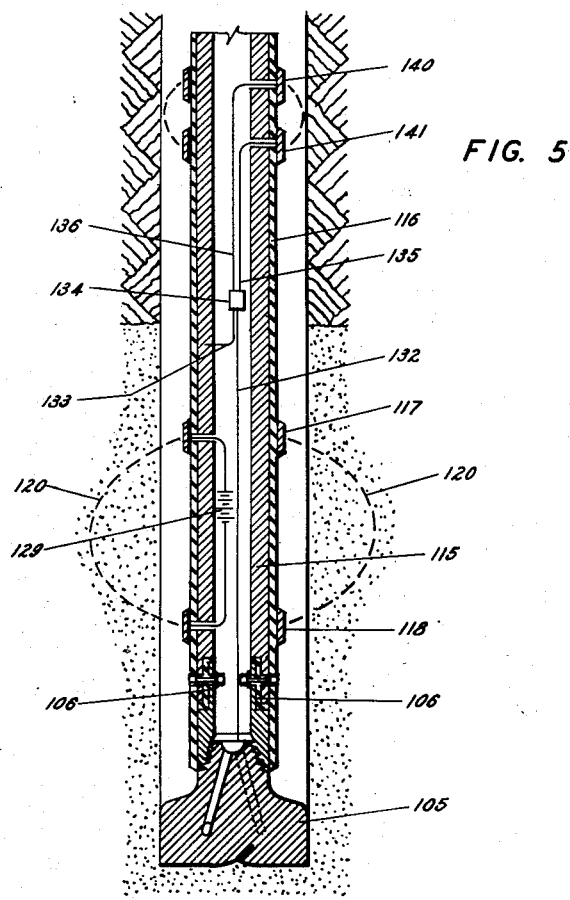
Fig. 5 is a cross-sectional view illustrating a modified drill collar which is specially constructed to provide a resistivity log and a log of spontaneous potential associated with the formations being drilled.
Figure 14:
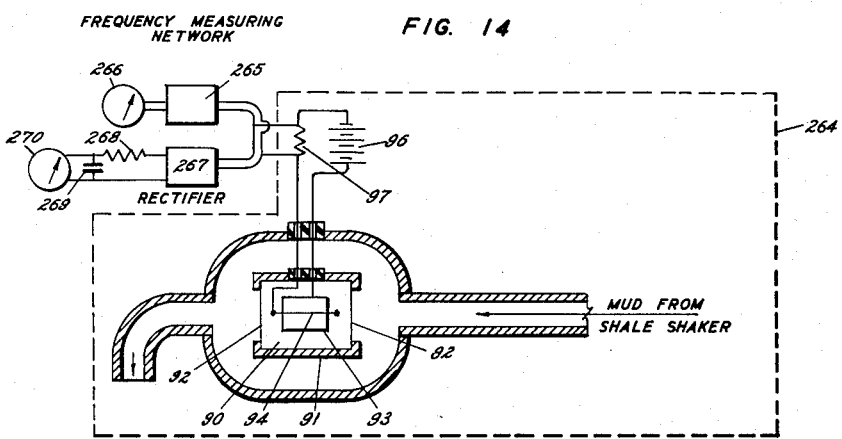
Figure 9:
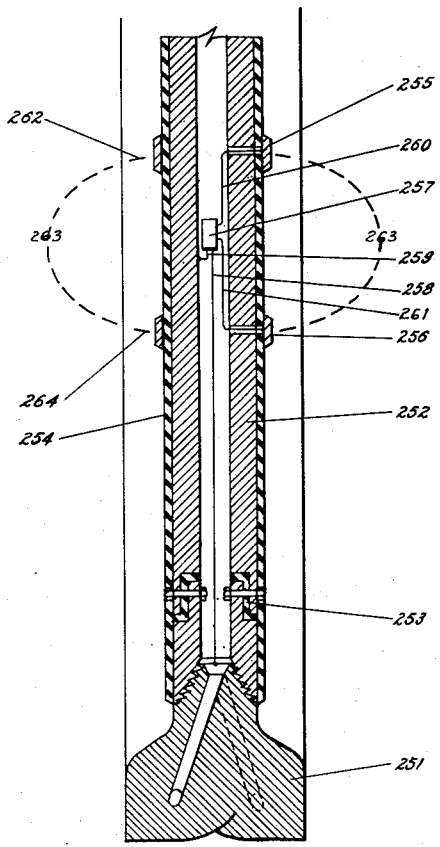
Figure 10:
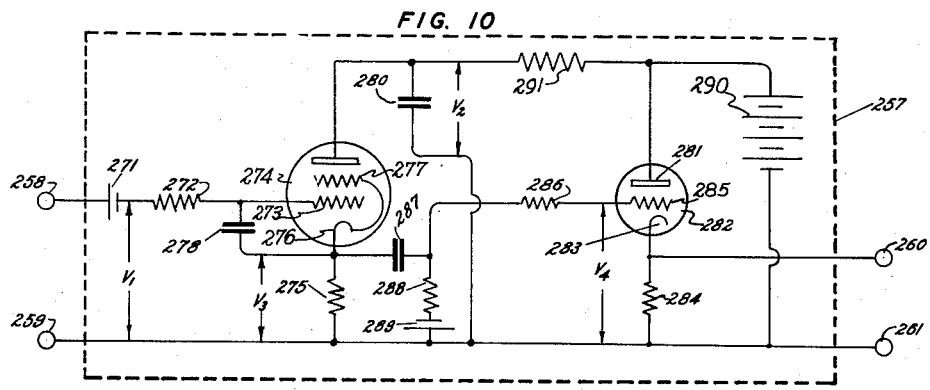
Figure 11:
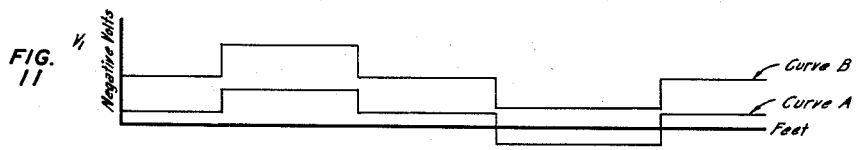
Figure 12:
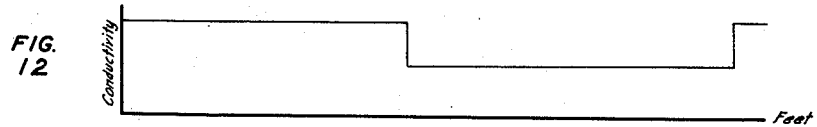
Figure 13:
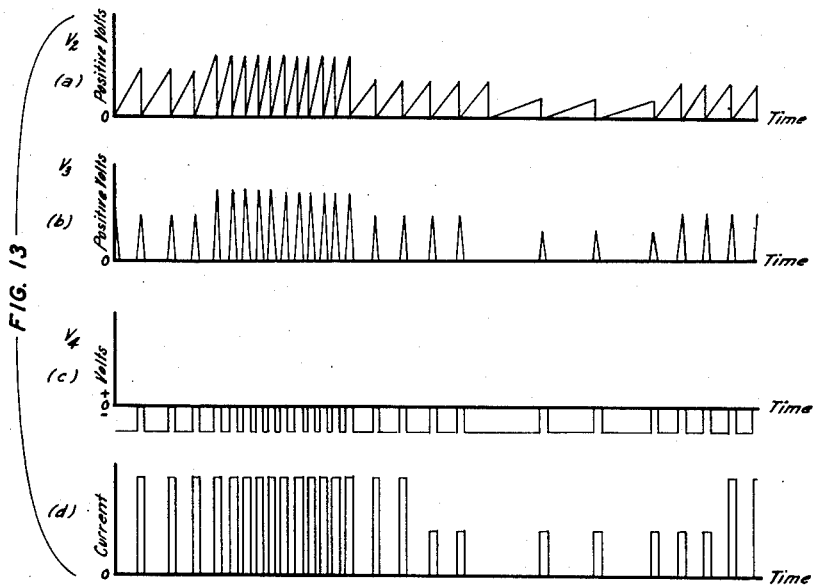

Fig. 6 diagrammatically illustrates radioactivity measuring apparatus used in combination with the collar shown in Fig. 5;

Fig. 7 illustrates apparatus for automatically compensating for various fluctuations occurring in the process;

Fig. 8 illustrates a modified embodiment of the invention;

Fig. 9 is a cross-sectional view illustrating a modified embodiment of the specially constructed drill collar;

Fig. 10 schematically illustrates a pulsing circuit adapted for use in combination with the drill collar shown in Fig. 9;

Fig. 11 is a graph illustrating the variation in spontaneous potential of a typical formation adjoining a drill hole as a function of the depth of the drill hole;

Fig. 12 is a graph illustrating the variation in formation conductivity as a function of hole depth;

Figs. 13a, 13b, and 13c are graphs illustrating the nature of the voltage pulses developed at various points in the pulsing circuit illustrated in Fig. 10;

Fig. 13d is a graph illustrating the nature of the current pulses developed at the output terminals of the pulsing circuit shown in Fig. 10; and Fig. 14 schematically illustrates radioactivity measuring apparatus adapted for use in combination with the drill collar shown in Fig. 9.

In brief, the objects of the present invention are realized by measuring a given characteristic, such as for example the value of the resistivity, natural potential and the like, of a geologic stratum at a determined depth within a drill hole and simultaneously introducing into the stream or drilling fluid or drilling mud, at the point of measurement, a radioactive tracer in a quantity accurately representative of the measured value of the characteristic under observation. This process is continued as the drilling progresses, and as the characteristic of the formation changes, the amount of radioactive tracer introduced into the drilling fluid is correspondingly changed. Circulation of the mud stream in the drill hole is utilized to carry the varying quantities of radioactive tracer to the top of the hole. Thus, by measuring the radioactivity of the mud leaving the well and comparing it with the radioactivity of the mud entering the well, the increase in radioactivity due to the radioactive tracer can be measured. This increase is in turn a function of the change in magnitude of the characteristic being measured at the bottom of the well. Of course, if the input mud is known to be substantially free of radioactivity, then the amount of radioactivity of the output mud will be directly indicative of the magnitude of the characteristic measured at the bottom of the well. By correlating specific input and output mud radioactivity increments and by relating them to the depth of the point of measurement, the subsurface formation may readily be logged.

Figure 1:
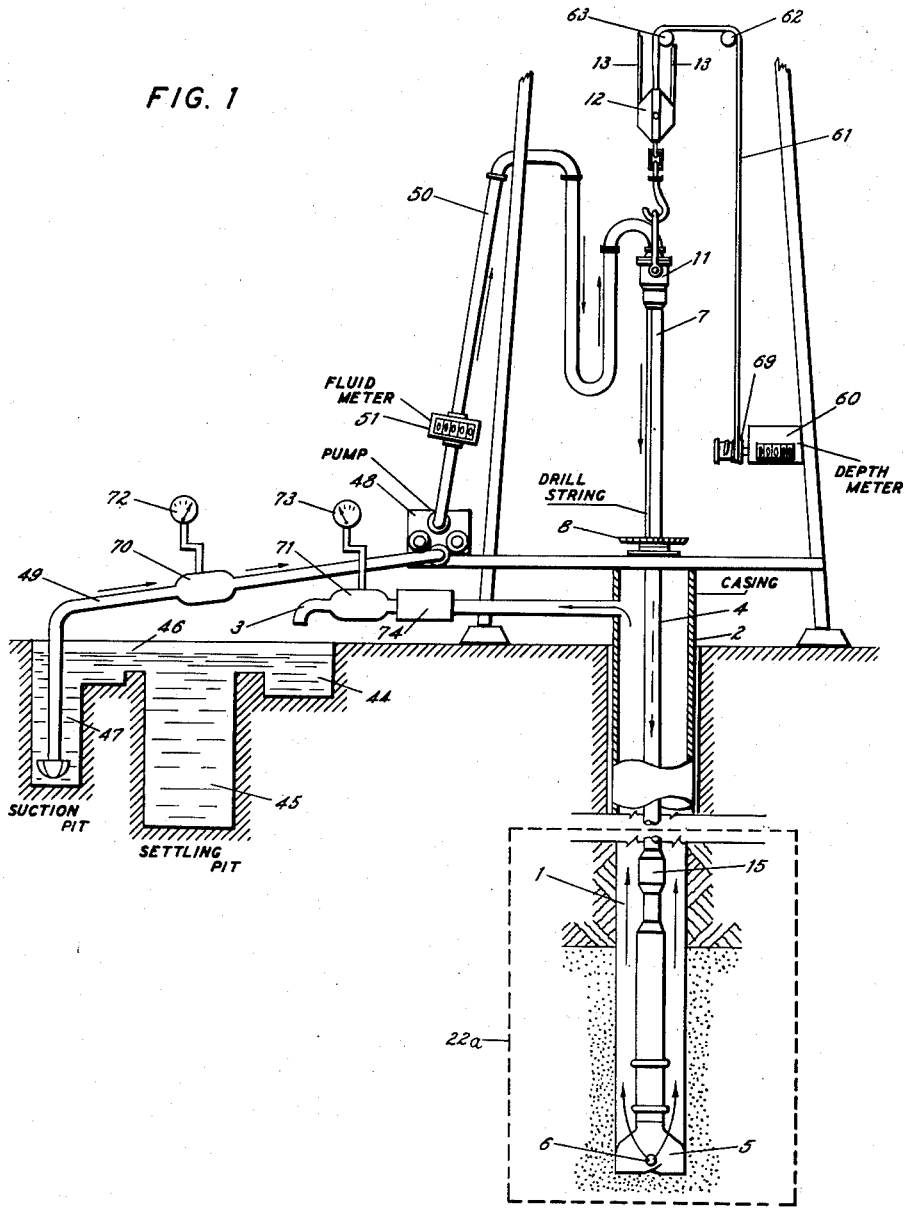
Fig. 1 is a longitudinal vertical section through a well being drilled with apparatus constructed in accordance with the present invention.

Referring now to the drawings and more particularly to Fig. 1 thereof, apparatus is there illustrated for drilling a well bore 1 in accordance with modern conventional rotary drilling practice, i. e., by the employment of a circulating hydraulic drilling fluid, such as a suspension of clay solids in water, and conventionally termed "rotary mud" or "drilling mud" to carry the drill cuttings out of the bore as the drilling operation proceeds. The upper portion of a well bore 1 is lined with a casing 2, generally termed the surface casing, which usually extends only a comparatively short distance into the well. At its upper end, the casing 2 is provided with a side outlet pipe which discharges into a "shale-shaker" 14, having the function of separating the formation cuttings carried upward by the drilling mud from the drilling mud itself. Extending into the well through the casing 2 and the well bore 1 is a conventional hollow drill string, designated generally by the numeral 4, which is connected at its lower end to a drill bit 5 having openings 6 provided adjacent the cutting teeth or cutting edge of the bit. A kelly joint 7 is connected to the upper end of the drill pipe and extends through a rotary table 8 mounted conventionally on the floor of a derrick. Rotation of the rotary table 8 engages the squared surfaces of the kelly joint 7 and thereby effects rotation of the drill string 4 in the usual manner to cause the bit 5 to cut through the formation. The upper end of the kelly joint 7 is connected to the usual rotary hose swivel 11 and the entire drill string is suspended from a traveling block 12 which is adapted to be raised and lowered in the derrick by means of a cable 13, all in accordance with conventional practice.

Referring now more particularly to the apparatus for circulating the drilling fluid through the well bore, it is pointed out with reference to Fig. 1 of the drawings that this apparatus comprises the usual mud ditch 44, settling pit 45, overflow ditch 46, pump suction pit 47, and mud pump 48 having a suction pipe 49 leading into the suction pit 47 and having a mud discharge conduit 50 which communicates with the drill pipe 4 through the swivel 11. A fluid meter 51 is connected in the conduit 50 and is adapted to measure the volumetric flow of the mud fluid flowing through the conduit 50. This fluid meter may be of any conventional type adapted to measure the amount of drilling fluid flowing through the well. The depth of the well may be measured at all times by any conventional method and this is commonly done by adding together the measurements of the lengths of all sections of drill pipe in the well, and by suitably marking the kelly to determine how much of its length has descended into the well. However, the depth measurements may also be conveniently obtained by suitable mechanical or automatic measuring devices well known in the art. A suitable mechanical depth measuring device is diagrammatically represented in the drawing as a depth meter 60 operated by means of a measuring line 61 passing over a measuring pulley 69 and leading over pulleys 62 and 63 to the traveling block 12, the measurement of the depth of the well or length of drill pipe in the well being recorded on this device in response to the downward movement of the traveling block 12 as it follows the downward movement of the drill string into the well.

Figure 2:
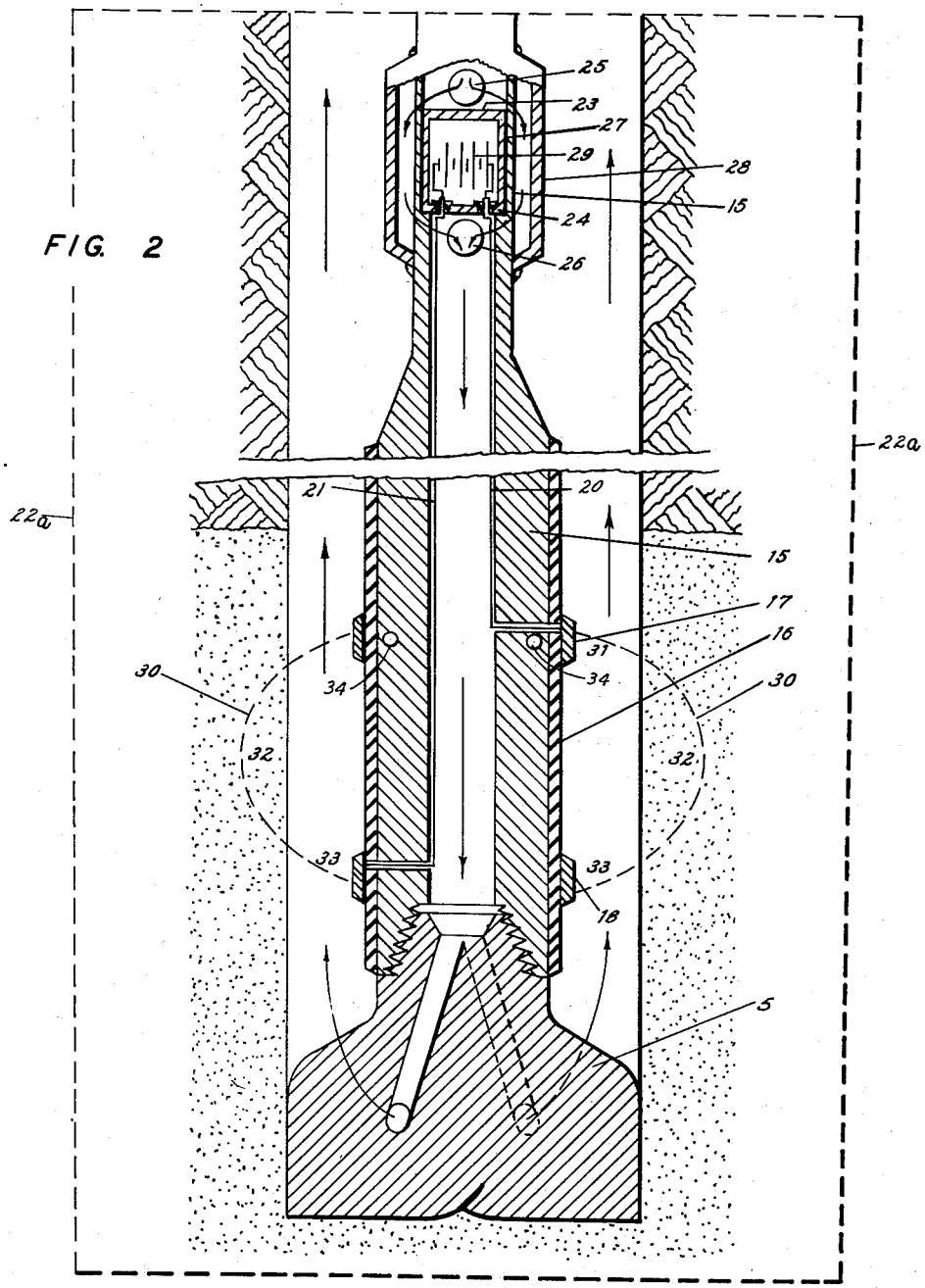
Fig. 2 is a vertical cross-section through the specially constructed drill collar forming the lower portion of the drill stem illustrated in Fig. 1.

That portion of the equipment shown in Fig. 1 of the drawings which is enclosed within the dashed rectangle 22a and comprises the lower end of the drill string 4 and the bit 5, is shown more in detail in Fig. 2 of the drawings. As there shown, the lower portion of the drill string, commonly called a drill collar and designated by numeral 15, is composed of one or more sections of drill pipe having increased wall thickness, in order to provide additional weight bearing on the bit and to decrease the whipping action which might otherwise occur to cause the hole to deviate from a straight line. A considerable portion of the drill collar 15 is covered with a wrapping or covering 16 of insulating material. Any reasonably flexible insulating material may be employed for this purpose. Alternatively, relatively inflexible insulating material, such, for example, as Bakelite, may be made in the form of a cylindrical casing which is securely fixed in place on the outside of the drill collar 15. Two metallic electrode rings 17 and 18, suitably spaced one from the other are firmly fastened about the upper and the lower portions, respectively, of the insulating structure 16. Each ring may consist of a solid cylindrical structure or of thin wire conductors wound or woven together to give a large effective contact surface area. As pointed out below, a difference of potential is applied between the rings 17 and 18 when the system is in use. Accordingly, the insulator 16 is dimensioned to project a substantial distance above and below the electrodes.

Two insulated conductors 20 and 21 are employed to connect the electrode rings 17 and 18, respectively, to opposite terminals of the voltage supply source, which is located above the electrode rings 17, 18. In the particular embodiment of the drill collar under consideration, a tubular shell 28 provided with conical ends welded to one section of the drill pipe is used to by-pass the drilling fluid around a cylinder 27 mounted inside this drill pipe section and containing the voltage supply source. More specifically, suitable openings 25 and 26, are cut in the wall of the drill pipe above the top 23 and below the bottom 24 of the cylinder 27, respectively, so that the flow of drilling mud through the drill string in this region is through the annular space between the drill string and the tubular shell 28. As indicated, the space within the cylinder 27 is occupied by a suitable voltage supply source such as a dry cell battery 29 capable of operating for several weeks without renewal. The positive terminal of this battery is connected by means of the insulated conductor 20 to the upper electrode ring 17 and the negative terminal of the battery 29 is connected by means of the insulated conductor 21 to the lower electrode ring 18. An electric switch (not shown), operated by the flowing pressure of the mud keeps the battery disconnected from the electrodes when the drill string is being lowered or withdrawn from the hole and when the mud pumps are shut down during an interruption of the drilling operation.

It will be understood that the difference of potential between the electrode rings 17 and 18 causes a current to flow along the path indicated by dashed lines 30. A portion of this current flows through the drilling fluid and the earth's formation in the immediate neighborhood of the drill bit. More in detail, the complete electrical circuit followed by the flow of current extends from the positive terminal of the battery 29 by way of the insulated conductor 20, the electrode ring 17, the mud section 31 adjacent the electrode ring 17, the adjoining portions of the earth's formation, said formations being located predominantly within the regions 32, the mud section 33, the electrode ring 18 adjacent thereto, and the insulated conductor 21 back to the negative terminal of the battery 29.

The geometry of the circulating system is so arranged that the resistance of the mud sections 31 and 33 is small as compared with the resistance of the formation through which the current is flowing. Consequently, the magnitude of current flow in the above traced circuit depends to a very large extent upon the conductivity of the formation in the region 32. As the drilling operation progresses, the drill bit encounters in its downward travel formations of varying conductivity and, accordingly, the magnitude of current flow in the described circuit varies substantially proportionately to the conductivity of the formation encountered. Such an electrode arrangement is well known in the art and is commonly used in electrical resistivity well logging.

In accordance with the present invention, the upper electrode 17 is preferably made of a material which is both electrically conductive and radioactive. When current passes from the electrode into the mud stream, it does so because the mud acts as an electrolyte and by a suitable selection of the electrode materials and of the voltage of the battery 29, the passage of the current into the electrolyte is accompanied by a migration of some of the material of the electrode into the mud stream. It is well known that when a suitable difference of potential is applied between two electrodes such as the electrodes 17 and 18 immersed in a conducting solution consisting of the drilling fluid therebetween, the magnitude of the current flowing through the drilling fluid depends not only upon the applied voltage, but also upon the extent to while an opposing electromotive force is built up at the surface of the electrodes. The production of this counter electromotive force, commonly known as polarization, is caused by the electrolytic deposition of material on one or both of the electrodes. It will be apparent that in the arrangement shown in Fig. 2 of the drawings, the electrodes may be depolarized in a conventional manner by removal of the cause of polarization. Thus a precipitate or a gas may dissolve or diffuse away the polarization products, or they may be removed or neutralized by chemical action or prevented from forming by using a suitable polarity reversing switch in the circuit. In case metal electrodes 17 and 18 are used, it is not necessary that the metal from which electrode 17 is constructed and which is sent into solution by the electric current itself be radioactive; e. g., the electrode may be made out of copper or lead in which radioactive phosphorus has been dissolved. When this copper or lead is sent into solution under the influence of the electric current, the radioactive phosphorus particles are released and carried upward by the mudstream. This phosphorus will oxidize and combine into phosphates while still retaining its radioactive characteristics. Another advantage of using such radioactive metalloid impurities in the electrode metal is that these impurities do not form positively charged ions and are therefore not subject to redeposition on the other electrode. Thus it is possible, through the use of a suitable alternating switch in the circuit, to alternately make each of the electrodes positive, thereby avoiding polarization effects.

If the drilling fluid separating the electrode rings 17, 18 were stationary, the radioactive ions entering the solution from the electrode 17 would be carried slowly downward by the existing electrostatic field and subsequently be deposited on the electrode 18. Under ordinary drilling conditions, however, the mud surrounding the drill string is usually in a state of rapid motion toward the top of the drill hole, i. e., in a direction opposite the very slow downward travel of the radioactive ions. Consequently, practically all of the radioactive ions released into the mud are immediately removed from the zone in which the electric field is present and remain in the mud as it is pumped to the earth's surface. As a result, they can be subsequently detected at any convenient location at the earth's surface. Moreover, the amount of radioactive material released into the mud is proportional to the magnitude of current flow in the above described circuit, and consequently is at any instant representative of the conductivity of the formation. Thus the mud in the immediate neighborhood of the electrode 17 is rendered radioactive to an extent directly representative of variations in the nature of the strata being drilled.

From the above explanation it will be evident that as the drilling operation proceeds, varying portions of a suitable radioactive substance are dispersed in successive increments of the drilling fluid column rising in the well, and although dispersed therein in exceedingly diluted proportions, the dispersed radioactive ions will hold their respective positions in the respective increments of the drilling fluid column into which they are dispersed. In accordance with this invention, a novel and useful method and apparatus has thus been devised whereby successive increments of the drilling fluid returning to the top of the well may be analyzed to determine the radioactivity in such successive increments. Furthermore, the movement of each increment of the drilling fluid may be traced in its passage through the well, and by suitable correlation with the depth of the stratum, measured in synchronism with the rise of the increments of the drilling fluid from that stratum, it becomes possible to determine the arrival at the top of the well of each increment of the drilling fluid with its radioactive content and to then measure the radioactivity of that increment and identify the resulting measurement with the stratum associated therewith.

Generally stated, and in accordance with the illustrative embodiment of this invention, a radioactive tracer is utilized to represent the resistivity of the formation drilled and is gradually dispersed in the neighborhood of said formation in successive increments of the drilling fluid column rising in the well. The location of the formation may be ascertained by determining the rate at which the circulation of the mud occurs, as by considering the rate of pumpage of the mud, the rate of penetration of the bit and by measurement of the depth of the formation at which the mud acquired the observed radioactivity. Also in accordance with this invention, use is made of the fact that hydraulic fluid flow through the well is in the form of a closely restricted stream, the incoming fluid being confined within the bore of a drill string, while the outgoing drilling fluid is confined within the annular space between the wall of the well bore and the outside of the drill string. While the drill string may be rotating at fairly high speed in contact with the drilling fluid moving upward on the outside of the drill string, very little mixing of lineally spaced increments of the fluid stream is known to occur. Therefore, the only changes produced in the radioactivity of any increment of the drilling fluid, are developed in the immediate vicinity of the electrode 17 and are produced by introduction into the fluid of variable quantities of the radioactive tracer substance. Consequently, by tracing said radioactive substance in its rise from that stratum to the top of the well, and by then analyzing its radioactivity, the electrical resistivity of the stratum can be determined, and its location in the well can be properly logged.

In order to measure the amount of radioactivity present in the drilling fluid as the fluid enters and leaves the well, suitable radioactivity detectors are provided which are respectively contained within vessels 70 and 71 and are respectively equipped with indicators 72 and 73 for providing indications of the amounts of radioactivity in the drilling fluid at the times when the measurements are performed. More specifically, the container 70 is connected in the suction pipe 49 of the drilling fluid circulating system and the radioactivity detector contained therein controls the indicator 72 to provide an indication of the radioactivity in the drilling fluid as the fluid is pumped into the well. The container 71 is connected in the outlet pipe 3 of the circulating system downstream from the shale shaker 74 and the radioactivity detector contained therein governs the indicator 73 to provide an indication of the radioactivity in the drilling fluid as the fluid is pumped out of the well. The detectors housed by the containers 70 and 71 are identical and accordingly only that contained within the container 71 has been illustrated.

Figure 3:
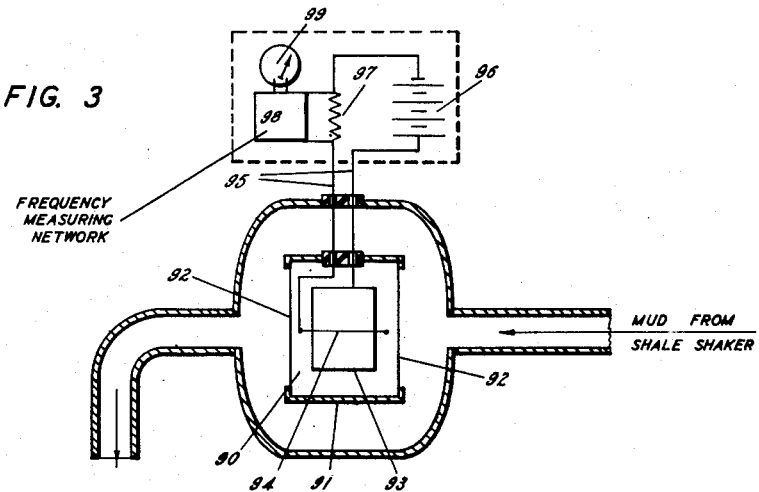
Fig. 3 shows diagrammatically radioactivity measuring apparatus used in the present improved system.

This detector, generally designated by the reference character 90 in Fig. 3 of the drawings, may be of any type well known in the art which is adapted to respond to beta or gamma radiations, derived from minute amounts of radioactive substance present in the drilling fluid. It consists of an envelope 91 of convenient shape and material, such, for example, as glass, and provided with one or more apertures 92 covered with a material such as mica or aluminum, of sufficient mechanical strength to exclude the drilling fluid and at the same time allow beta particles emitted from the radioactive substance within the drilling fluid to easily pass into the detector chamber. In case gamma radiations are to be detected, the covered aperture can be dispensed with since gamma radiations pass through relatively thick metallic walls. Two or more electrodes 93 and 94, which may have various geometrical shapes and relative positions, such as, for instance, rectangular grids whose planes are parallel, or coaxial concentric cylinders, are introduced into the envelope 91 and the whole is rendered gas tight by any suitable means. The interior is evacuated and a suitable quantity of gas, such as, for example, neon, is introduced until a suitable pressure corresponding to from five to ten cm. of mercury is obtained. The electrodes 93 and 94 are connected by leads 95 to an electrical circuit consisting of a battery 96 connected in series with a resistor 97. This resistor is connected to the input terminals of a frequency measuring network 98, the output terminals of which are connected to the input terminals of the indicating meter 99. The frequency measuring network may be of the type described as "A Counting Rate Meter for Radioactivity Measurements" in The General Radio Experimenter, vol. XXII, Nos. 2 and 3, July–August 1947. It functions to convert a succession of received current impulses into a direct voltage having a magnitude representative of the number of current impulses received per unit of time. The indicator 99 may be a standard millivoltmeter.

In the operation of the detector 90 and associated equipment, the voltage of the battery 96 is adjusted to a suitable value and beta (or gamma) particles entering the enclosed ionization chamber of the detector are recorded as follows: A beta (or gamma) particle emitted from the radioactive substance within the drilling fluid enters the ionization chamber and produces a number of ions in the enclosed gas. Under the influence of the electric field existing between the electrodes 93 and 94 of the detector, ionization takes place by collision of gas molecules and a current impulse is generated which traverses the circuit comprising the resistance 97, the current source 96 and the electrodes 93 and 94 of the detector. This current impulse causes a corresponding voltage impulse to be developed across the resistor 97. The frequency with which current impulses traverse the resistor 97 is, of course, determined by the rate at which the radioactive particles enter the ionization chamber of the detector. This frequency determines the magnitude of the voltage developed at the output terminals of the network 98 and hence the indication provided by the meter 99.

Comparison between the radioactivity content of the input and output mud to the well is made in a well known manner by taking into account the time lag involved in the travel of a mud log sample from the top of the drill hole to the formation at which the measurement is performed, and from said formation back to the top of the drill hole. Correction for this time lag is effected by utilizing the indications of the fluid meter 51 and the depth indicator 60 in a manner well known in the art. A detailed description of a method for accurately making the corrections occasioned by the described time lag and of applying these corrections to measurements of input and output mud samples can be found, for example, in United States Patent No. 2,342,273, issued to John T. Hayward on February 22, 1944.

Figure 4:
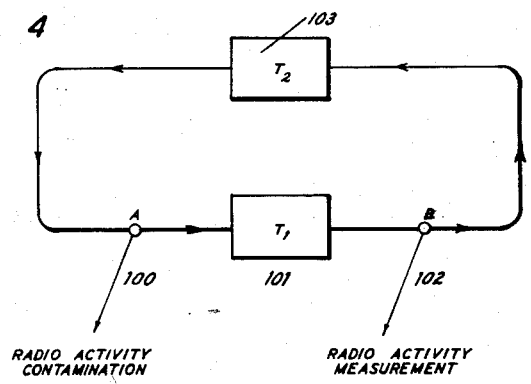
Fig. 4 is a schematic representation of the sequence of steps making up the present method.

From the above explanation, it will be apparent that the electrode 17 may contain any substance capable of spontaneous nuclear disintegration and having any desired half life period. Such a substance may be long lived, such as radium, or it may have a considerably shorter half life of the order of magnitude of the time interval required for the tracer to complete the path from the bottom of the drill hole to the earth's surface. The most suitable life time for radioactive tracer can be determined from a consideration of Fig. 4 of the drawings, which schematically represents one complete cycle of operations involved in the process. In this cycle, the point A represents the instant at which a determined portion of radioactive material enters the mud stream, and the point B represents a subsequent instant at which said portion is measured at the earth's surface. The block $T_1$ represents the time delay caused by the mud traveling upward within the annular space bounded by the drill pipe on the one side of the wall of the borehole or casing on the other, and the block 103 represents the time interval during which the mud increment remains in the slush pit and then returns through the drill pipe from the surface to the subsurface. Under conditions normally found in drilling a well at a depth of 4000 feet, for example, the delay $T_1$ represented by the block 101 may equal 25 minutes, and if a large slush pit is employed the delay $T_2$ represented by the block 103 may be as much as four hours. In such a system, it is desirable to inject into the mud stream a material capable of carrying the information to the surface by maintaining its radioactivity for an interval greater than the period $T_1$, but which for periods in excess of $T_1$ but smaller than $T_2$ decay in radioactive intensity to a negligible amount. In the example given above where $T_1$ equals 25 minutes and $T_2$ equals four hours, therefore, it is desirable to use a radioactive substance having a rate of decay such that after the period $T_1$ expires, measurable radioactivity still exists, and that after the period $T_2$ expires, the radioactivity is non-measurable. Some of the radioactive elements satisfying these requirements are as follows:

$\frac{36}{17}$ Cl having a half life of 35 minutes $\frac{38}{17}$ Cl having a half life of 40 minutes $\frac{103}{45}$ Rh having a half life of 44 minutes $\frac{128}{53}$ I having a half life of 25 minutes Each of the above tracers loses its radioactivity at such a rate that after completing one cycle in the travel of drilling fluid, its contribution to the radioactivity of the input sample can be neglected. Therefore, it becomes unnecessary for the operator to take a sample of the entering increment for comparison purposes. On the contrary, it is only necessary to sample the outgoing mud, and correlate the radioactivity measurement with the reading of the fluid meter in the manner described above in order to log the measured characteristic of the subsurface strata under observation.

Referring now more particularly to Figs. 5 and 6 of the drawings, the modified system there illustrated is adapted simultaneously to measure and record two different characteristics of a subsurface stratum, such, for example, as the resistivity and the natural potential. To this end and as best shown in Fig. 5 of the drawings, the drill bit 105 is electrically insulated from the drill collar 115 in order that a potential difference may be developed therebetween. This is accomplished by interposing a sleeve 106 of insulating material between the bit and collar. The drill collar 115 is maintained at the potential of the earth through its connection with the drill string which is in continuous contact with the surface casing and the upper part of the drill hole and also with the mud surrounding the drill string throughout the length of the hole. This collar is provided with an elongated insulating cylinder and two pairs of electrode rings 117, 118 and 140, 141 which surround the cylinder. The electrode rings 117, 118 are electrically connected to a battery 129 positioned within a suitable chamber formed within the drill pipe in such manner that flow of the drilling fluid through the drill pipe is not interfered with, and the difference of potential thus developed between the electrode rings 117 and 118 causes a current to flow through the adjoining formation along the paths indicated by the dashed lines 120. It will be understood that the value of the current flowing from the electrode 117 to the electrode 118 depends to a very large extent upon the conductivity of the formation. The electrode 117 contains a suitable radioactive substance which under the influence of the current becomes gradually dissolved in the drilling fluid, the rate of migration of radioactive ions from the electrode into the fluid depending at any instant upon the magnitude of current flow and hence upon the conductivity of the adjoining formation.

It will thus be apparent that the arrangement comprising the electrodes 117 and 118 and battery 129 is similar to the arrangement within the dotted rectangle 22a and performs the same function, i. e., that of introducing into the drilling fluid a radioactive tracer substance in quantities representative of the resistivity of formation in the neighborhood of electrodes 17 and 18. The Fig. 5 arrangement is, however, characterized by one distinguishing feature, viz, the disintegration of the radioactive substance in the electrode 117 is accompanied by the emission of two different radiations such as beta and gamma rays. Such a substance may contain, for example, $^{27}$Mg. (or $^{41}$Ca, or $^{42}$K). Consequently, the amount of tracer in the drilling fluid can be determined not alone by a beta ray detector but also by means of a gamma ray detector. Hence, the intensity of the gamma radiation is representative of the quantity of $^{41}$Ca, or $^{27}$Mg, or $^{42}$K in the drilling fluid and may be used as an indication of the conductivity of the formation drilled.

The closely spaced electrode rings 140 and 141 surrounding the insulating cylinder 116 at a suitable distance above the electrode rings 117 and 118, are part of a second measuring system adapted to measure the spontaneous potential generated at the interface between the formation and the drilling fluid. It will be understood that because of electrofiltration and electrochemical effects, a difference of potential occurs spontaneously between the insulated drill bit 105 and the grounded drill collar 115. The drill bit and the drill collar are connected by means of circuit leads 132 and 133, respectively, to an amplifier 134 positioned within the drill collar in a manner such that the flow of the drilling fluid through the drill string is not interfered with. The input voltage to the amplifier 134 is in the millivolt range and represents the spontaneous potential generated at the interface between the neighboring formations. This voltage is amplified by the amplifier 134 and applied across the electrodes 140 and 141. The electrode 140 contains a radioactive substance having properties different from the properties of the substance contained within the electrode 117. Specifically, the substance in the electrode 140 contains an element such as $^{64}$Cu which emits beta radiations only, while the substance in the electrode 117 emits both beta and gamma radiations. It thus becomes apparent that under the influence of the varying current derived from the amplifier 134 a varying amount of radioactive copper is continuously dissolved in the drilling fluid, the amount being at any instant representative of the spontaneous potential difference between the drilling bit 105 and the grounded drill collar 115.

As in the system shown in Fig. 1 of the drawings, the electrostatic field produced between the electrodes 140 and 141 tends to move the ions of radioactive copper downwardly from the electrode 140 to the electrode 141. Similarly, the electrostatic field produced between the electrodes 117 and 118 tends to move the ions of radioactive magnesium downwardly from the electrode 117 toward the electrode 118. However, because of the much greater upward motion of the mud stream, the radioactive ions of copper and magnesium remain in the drilling fluid and are carried to the earth's surface. A mixture of two different radioactive tracers, such as radioactive magnesium and radioactive copper, is thus obtained in the mud stream, and subsequently at the earth's surface. The radioactive magnesium is discharged into the mud stream in quantities representing the conductivity of formations encountered, and the radioactive copper is discharged into the mud stream in quantities representing the magnitude of the spontaneous potential.

In order separately to identify the above two tracers and to obtain separate measurements of resistivity and spontaneous potential, there is provided at the outlet pipe 3 a detector unit comprising two detectors 190a and 190b. These detectors are shown in Fig. 6 of the drawings as being disposed within a container 171 connected in the outlet pipe 3 of the mud circulating system shown in Fig. 1. The detector 190b is provided with steel walls of such thickness as to stop all beta radiations and to allow only gamma radiations to pass through its walls into the ionization chamber for detection. The detector 190a, on the other hand, has a substantial portion of its walls made of a thin aluminum sheet, in order to allow the beta rays to pass into the gaseous medium of the ionization chamber for detection. A circuit serially including the electrodes of the detector 190a, a battery 196a and a resistor 197a is used to translate the detection of radioactive ions by the detector 190a into voltage impulses which are impressed across a frequency measuring network 198a having the function of delivering to the millivolt meter 199a a voltage proportional in magnitude to the frequency of the detected voltage pulses. Similarly the frequency measuring network 198b cooperates with the circuit elements 196b and 197b and the detector 190b to deliver a direct voltage to the meter 199b having a magnitude which is proportional to the rate of radioactive ion detection by the detector 190b. Thus the meter 199b functions to indicate the intensity of gamma ray detection by the detector 190b, i. e., the amount of radioactive magnesium in the mud stream, and the meter 199a functions to indicate the combined intensity of gamma and beta ray detection by the meter 190a, i. e., the amount of radioactive copper in the mud stream. If at any given instant the indication provided by the meter 199b is $N_1$, it can be assumed that $N_1$ represents the conductivity of the subsurface formation adjoining the point at which the tracer was dissolved. On the other hand, the indication provided at any instant by the meter 199a, which may be assumed to be $N_2$, represents the gamma and beta radiation, i. e., it corresponds to the combined contribution of both the radioactive magnesium and the radioactive copper of which one represents conductivity and the other represents the variation in spontaneous potential. Consequently, $$N_2 = K_1 N_1 + K_2 N_3$$

where $K_1$ and $K_2$ are appropriate constants and $N_3$ represents the variation in the spontaneous potential. From the indications provided by the meters 199a and 199b, the values $N_1$ and $N_3$ may thus be obtained, the first representing subsurface conductivity and the second representing variations in the spontaneous potential associated with the formation being drilled.

In certain cases it is possible to use an electrode 17 as shown in Fig. 2 of the drawings made of a material which is not radioactive but which is caused to become radioactive when irradiated with neutrons. If this system is used, suitable openings 34 may be provided in the wall of the drill collar 15 in radial alignment with the electrode 17 to receive the neutron source material. It is well known that a number of elements develop a strong radioactivity when exposed to neutron bombardment. The half lives of the activities thus induced may vary over a considerable range. Some of the typical reactions are as follows, the half lives being designated as T in each instance:

(1) $^{23}Na(n_1\gamma)^{24}Na$; $^{24}Na \rightarrow$
$^{24}Mg + e^-$ ($T = 15$ hours)

(2) $^{26}Mg(n_1\gamma)^{27}Mg$; $^{27}Mg \rightarrow$
$^{27}Al + e^-$ ($T = 10$ minutes)

(3) $^{41}K(n_1\gamma)^{42}K$; $^{42}K \rightarrow ^{42}Ca + e^-$ ($T = 14$ hours)

(4) $^{55}Mn(n_1\gamma)^{56}Mn$; $^{56}Mn \rightarrow$
$^{56}Fe + e^-$ ($T = 2.5$ hours)

(5) $^{62}Ni(n_1\gamma)^{63}Ni$; $^{63}Ni \rightarrow ^{63}Cu + e^-$ ($T = 2.7$ hours)

(6) $^{107}Ag(n_1\gamma)^{108}Ag$; $^{108}Ag \rightarrow ^{108}Cd + e^-$
($T = 2.4$ minutes and $T = 225$ days)

(7) $^{164}Dy(n_1\gamma)^{165}Dy$; $^{165}Dy \rightarrow ^{165}Ho + e^-$
($T = 2.5$ hours)

(8) $^{196}Pt(n_1\gamma)^{197}Pt$; $^{197}Pt \rightarrow ^{197}Au + e^-$
($T = 1.8$ hours)

(9) $^{197}Au(n_1\gamma)^{198}Au$; $^{198}Au \rightarrow ^{198}Hg + e^-$
($T = 2.7$ days)

Assume, for instance, that the electrode 17 contains manganese and that the neutron source consists of standard radium-beryllium mixture surrounded by a layer of paraffin to slow down the neutrons, the mixture being produced as a result of the bombardment of the beryllium target by alpha rays from radium. The slow neutrons thus produced enter into the electrode 17 and render the manganese atoms radioactive in accordance with the reaction of Equation 4 above. The radioactive isotope of manganese produced as a result of this reaction emits beta radiation and has a half life time of 2.5 hours. It will thus be apparent that in accordance with the process described above, the amount of radioactive manganese dissolved in the mud will be at any time proportional to the conductivity of the formations traversed by the drill bit. It serves as a tracer representative of the subsurface conductivity, and is carried by the mud stream to the top of the drill hole to produce the above-described response of the radioactivity detector 71, with the result that the meter 71 provides an indication of the conductivity of the formation. The electrode 17 may be constructed of other materials, containing, for example, sodium, magnesium, potassium, nickel, etc., in which cases and in accordance with the reactions of Equations 1, 2, 3, 5, etc., shown above, the radioactive tracer emitted will be the beta ray emitting isotope of the corresponding element, having half lives of 12 hours, 10 minutes, 14 hours, 2.7 hours, etc., respectively.

It should be pointed out that in the above-described system, the concentration of the radioactive tracer contained in the mud stream may vary for reasons other than changes in formation resistivity, such as fluctuations in the velocity of the drilling mud due to the employment of different pumps or varying pump speeds, and a decrease in the concentration of the radioactive material employed as a tracer occasioned by its gradual decay with time. Various methods may readily be employed to compensate for these variations, and one of such methods is instrumented through use of the apparatus shown in Fig. 7 of the drawings, which should be used in conjunction with the drill collar and bit assembly shown in Fig. 2. This apparatus is in the form of a Wheatstone bridge which comprises four arms as follows: an ionization chamber 400, an ionization chamber 401, a resistor 402, and a resistor 403. The bridge circuit is energized by a battery 404 connected between two opposed terminals of the circuit, and the output voltage of the circuit as developed across the other two terminals thereof is delivered to a direct current amplifier 405. This amplifier delivers its output current through an electrode assembly 406 to the galvanometer coil of a recording element embodied in a strip recorder 407. The two ionization chambers 400 and 401 are of a conventional type preferably having a capacity of 1 liter and filled with argon at 100 atmospheres. The resistors 402 and 403 have values of $10^{11}$ and $2 \times 10^{11}$ ohms, respectively. The amplifier 405 is a conventional direct current amplifier capable of a large direct current output, and the electrodes 406 consist of two groups, each comprising a series of spaced metallic electrode plates. The electrode plates belonging to these two groups are alternately interconnected as shown in the figure, and the anode group of plates contains a radioactive material which is identical to the one used in the electrode ring 17, shown in Fig. 2 at the lower end of the drill string. It will be seen that the resistor 403 has twice the ohmic value of the resistor 402 and, consequently, the Wheatstone bridge is balanced only when the resistance of the ionization chamber 400 is twice the resistance of the ionization chamber 401, i. e., when the radioactivity of the mud in the immediate neighborhood of the ionization chamber 400 is one-half the radioactivity of the mud in the immediate neighborhood of the ionization chamber 401.

In the operation of the detecting apparatus just described, the electrodes 406, when supplied by a current from the amplifier 405 place the radioactive tracer material in solution in the mud at a rate determined by the magnitude of the output current of the amplifier 405. When the radioactivity in the neighborhood of the ionization chamber 401 is less than twice the radioactivity in the neighborhood of the ionization chamber 400, the Wheatstone bridge is unbalanced and a voltage representative of the degree of this unbalance is supplied to the amplifier 405. Since the output terminals of the amplifier are connected to deliver the amplifier output current to the electrodes 406, the current passing between the electrodes 406 in the drilling fluid is proportional to the unbalance in the Wheatstone bridge. The radioactive material of which the electrodes 406 are made is dissolved in the drilling fluid in accordance with the variation of the current traversing the electrodes in the exact manner previously explained. This process continues until the radioactivity of the mud in the neighborhood of the ionization chamber 401 is raised to a bridge balance value of almost twice the value of the radioactivity in the neighborhood of the ionization chamber 400. As this balance is approached, the voltage input to the amplifier 405 becomes exceedingly small, i. e., almost zero, and the output of the amplifier likewise becomes exceedingly small. An approach to a condition of complete balance can be realized if the amplification provided by the amplifier 405 is sufficiently high.

Assume now that the radioactivity of the mud stream flowing out of the drill hole towards the ionization chamber 400 increases from a value at which a balanced condition of the system prevails. In response to this radioactivity increase, the output voltage of the bridge circuit immediately increases, thus causing more radioactive material to be dissolved into the mud stream by the electrodes 406 until the system balance is again established. On the other hand, if the radioactivity of the mud coming out of the casing towards the ionization chamber 400 decreases, then the output voltage of the bridge circuit is correspondingly decreased, thus causing less radioactive material to be dissolved into the mud stream by the electrodes 406 until a condition of system balance is again established. It will thus be understood that the radioactivity in the neighborhood of the ionization chamber 401 is always maintained about twice the radioactivity in the neighborhood of ionization chamber 400, and that the unbalance or output voltage of the Wheatstone bridge circuit is a measure of the radioactivity which is added to the mud stream to maintain such a relationship. It will also be apparent that the current passing through the electrodes 406 varies with the radioactivity content of the drilling mud in accordance with a relationship that is similar to the one between the current passing through the electrode ring 17 and the corresponding amount of radioactive tracer dissolved into the mud. The arrangement comprising the electrode ring 17 can be visualized as a transducer converting the different current intensities into corresponding quantities of radioactivity. The arrangement comprising the electrodes 406 is an inverse transducer, which reconverts the radioactivity that has migrated to the earth's surface back into an electrical current which flows from the output terminals of the amplifier 405. The magnitude of this current is recorded by the strip recorder 407 and provides a reliable index of the formation conductivity which is obviously made independent of fluctuations of the mud velocity and of the natural decay of the radioactive tracer material in electrode 17.

In Fig. 8 of the drawings there is illustrated a modified embodiment of the present invention which does not involve any resistivity measurements and subsequent use of radioactive tracers serving as a resistivity index, but is based upon direct detection of various substances present in the formation. The process consists in direct irradiation by a stream of neutrons of the formation drilled, whereby a number of substances present in the formation become radioactive, subsequently utilizing the mud stream to carry these substances to the top of the drill hole, and in measuring radiations derived from said substances. In general, the arrangement for carrying out the process is illustrated in Fig. 1 in which, however, the lower portion of the drilling equipment included within the dotted rectangle 22a is replaced by the drill bit and collar arrangement diagrammatically represented in Fig. 8. As there shown, the lower end 204 of the drill string is connected to a drill bit 205 of conventional design. Within the drill bit 205 two openings 206 and 207 are provided which contain a source of neutrons such, for example, as a radium-beryllium mixture. As a result of neutron bombardment of the adjoining formation nuclear transmutations take place, some of which are as follows, the half lives being designated as T in each instance:

$^{37}Cl(n_1\gamma)\,^{38}Cl;\ ^{38}Cl \to ^{38}A + e^- (T=37\ \text{minutes})$
$^{41}K(n_1\gamma)\,^{42}K;\ ^{42}K \to ^{42}Ca + e^- (T=16\ \text{hours})$
$^{56}Fe(np)\,^{56}Mn;\ ^{56}Mn \to ^{56}Fe + e^- (T=2.6\ \text{hours})$
$^{27}Al(np)\,^{27}Mg;\ ^{27}Mg \to ^{27}Al + e^- (T=10\ \text{minutes})$ As a result of these transmutations, various radioactive isotopes such as $^{38}Cl$, $^{4}Ca$, $^{56}Fe$, $^{2}Al$ are produced under the effect of neutron bombardment. These radioactive isotopes will normally be contained in the comparatively small cylinder of cuttings drilled out by the bit, and will become dilutedly dispersed by the action of the drill bit in the upwardly rising column of drilling fluid, and may, by suitable method of analysis, be detected in the drilling fluid upon its return to the top of the drill hole. During the drilling operation, the successive portions of the material drilled from the strata, and the radioactive isotopes contained therein, are dispersed in successive increments of the drilling fluid column rising in the well, and although dispersed therein in exceedingly diluted proportions, the dispersed contents will retain their respective positions in the respective increments of the drilling fluid into which they are dispersed. In accordance, therefore, with this invention, a novel and useful method and apparatus has been devised whereby successive increments of the drilling fluid returning to the top of the well may be analyzed to determine the presence of radioactive isotopes in such successive increments. Furthermore, the movement of each increment of the drilling fluid may be traced in its passage through the well, and by suitable correlation with the depth of the stratum, measured in synchronism with the rise of the increments of the drilling fluid from that stratum, it becomes possible to analyze the increment and correlate the resulting analysis with the stratum responsible therefor.

In certain of the above-described embodiments of the invention, the radio active tracer is continuously dissolved in the circulating fluid in amounts representative of the subsurface formation characteristic under observation. Since the process is continuous, it may eventually lead to a concentration of radioactive substance in the drilling fluid which exceeds the permissible limit for performing a satisfactory measurement. It is obviously desirable to maintain the radioactive concentration at a relatively low value. The concentration of the radioactive substance in the drilling fluid is proportional to the half life of the substance and to its rate of dissolution in the drilling fluid, and is inversely proportional to the volume of drilling fluid used in the circulatory system. Therefore, concentration of the radioactive substance in the drilling fluid is most likely to occur when radioactive tracers of relatively long half life are used in drilling wells of small diameter having correspondingly small mud pits associated therewith.

In order to utilize radioactive tracers of long life and at the same time keep the concentration of radioactivity relatively low, i. e., within the permissible limit, a modified embodiment of the present improved system may be employed in which the radioactive tracer substance is intermittently released in small quantities at determined instants, i. e., in short impulses separated by suitable time intervals. To this end, the apparatus illustrated in Figs. 9 and 10 of the drawings may be employed intermittently to release the radioactive tracer into the drilling fluid traversing the fluid circulating system. In brief, and as best shown in Fig. 9 of the drawings, this apparatus comprises a specially constructed drill tool attached to the lower end of the drill string and consisting of a drill bit 251 and drill collar 252 electrically insulated from each other by means of an appropriate rubber sleeve 253 interposed therebetween. The drill collar is maintained at earth potential through its connection with the drill string which is in continuous contact with the surface casing and the upper part of the bore hole and also with the mud surrounding the drill string throughout the length of the drill hole. It carries an elongated insulating sleeve 254 and a pair of spaced electrode rings 255 and 256 which clampingly embrace the sleeve. The electrode rings are electrically connected to the output terminals of a current pulse generator 257 which is positioned within a suitable opening in the drill pipe in such manner as not to interfere with the circulation of the drilling fluid in the circulating system, and is provided with input terminals 258 and 259 connected respectively to the drill bit 251 and to the grounded drill collar 252.

The impulse generator 257 may be of the character illustrated in Fig. 10 of the drawings. In brief, this generator comprises a relaxation oscillator stage comprising a gas filled electron discharge tube 274 and a pulse shaping stage comprising an electron discharge tube 282. More specifically, the tube 274 is of the well known tetrode type provided with input electrodes, i. e., a control grid 273 and cathode 276, coupled to the generator input terminals through a cathode resistor 275, a grid resistor 272 and a grid biasing C-battery 271. A condenser 278 is connected between the cathode and control grid of the tube 274 to provide a path for the current pulses traversing the input circuit of this tube during operation of the generator. The output circuit of the oscillator stage conventionally comprises a condenser 280 connected in series with the cathode resistor 275 across the cathode and anode of the tube 274. Voltage pulses developed across the cathode resistor 275 are impressed between the input electrodes 283 and 285 of the tube 282 through a coupling network which comprises a grid resistor 286, a cathode resistor 284, a coupling condenser 287 and resistor 288 and a grid biasing C-battery 289. Anode current is supplied to the tube 282 from a battery 290, and the output voltage pulses developed across the resistor are directly applied to the output terminals 260 and 261. The battery 290 also supplies charging current to the condenser 280 through a resistor 291 having the function of determining the rate of charging of the identified condenser.

In considering the operation of the impulse generator 257, it will be understood that the spontaneous potential developed between the electrode ring 256 and the drill bit 251 is impressed between the input terminals 258 and 259, and that the voltage pulses developed across the output terminals 260 and 261 are impressed between the electrode rings 255 and 256. More specifically, the variations in the spontaneous potential and conductivity of the formation adjacent the drill tool may be graphically illustrated in the manner shown in Fig. 11, curve A, and in Fig. 12 of the drawings, respectively. In both figures, the abscissa represent depth in feet. In Fig. 11, curve A, the ordinate line is scaled in terms of spontaneous potential (in negative volts) occurring at various depths in the drill hole, and in Fig. 12 the ordinate line is scaled in terms of formation conductivity at various depths in the drill hole.

When a voltage varying in accordance with curve A of Fig. 11 is impressed across the input terminals 258 and 259 of the impulse generator, a voltage of identical pattern but shifted in absolute value by an amount equal to the voltage of the biasing battery 271 is negatively applied to the control grid 273 of the oscillator tube 274. More specifically, the battery 271 has the effect of shifting the input voltage pattern to the tube 274 in a negative sense in the manner shown by curve B in Fig. 11. It will be noted that this voltage is always negative. The tube 274 and its associated input and output circuits are connected to function as a conventional relaxation oscillator, such that the current impulses developed in the oscillator output circuit vary both in magnitude and in frequency in accordance with the magnitude of the voltage negatively applied to the grid 273 of the oscillator tube. The anode current pulses thus caused to traverse the space current path of the tube 274 result in the production of a voltage $V_2$ across the condenser 280 having the pulse pattern illustrated in Fig. 13($a$) and in the production of a voltage $V_3$ across the resistor 275 having the pulse pattern illustrated in Fig. 13($b$). It will be noted that both of these voltages vary in magnitude in accordance with variations in the input voltage as represented by curve B of Fig. 11, and that the frequency of the pulse components making up these voltages similarly varies directly in accordance with the magnitude of the generator input voltage. The oscillator output voltage as developed across the cathode resistor 275 is impressed across the input circuit resistor 288 of the tube 282 through the coupling condenser 287 in the correct sense to drive the grid 285 of the tube 282 positive. This voltage is opposed by the fixed voltage of the biasing battery 289. The resultant voltage is negatively applied to the grid 285 of the tube 282 through the grid resistor 286 and due to the pulsed characteristic thereof causes current pulses to be developed in the output circuit of the tube 282. More specifically, the biasing battery 289 has a voltage sufficient to bias the tube 282 beyond cutoff when the oscillator section of the generator is quiescent. Each pulse of the voltage $V_3$, on the other hand, has a magnitude sufficient to drive the grid of the tube 282 positive even though opposed by the voltage of the battery 289. However, the resistor 286 prevents the tube 282 from drawing grid current and hence prevents the grid 285 from being driven positive relative to the cathode 283. As a result, the voltage $V_4$ applied between the input electrodes of the tube 282 varies back and forth between a zero value and the negative cutoff value determined by the voltage of the battery 289 in the manner illustrated in Fig. 13($c$). The tube 282 is thus alternately biased to cutoff and rendered fully conductive in accordance with the cyclic variations of the voltage impressed between its input electrodes.

When the tube 282 is rendered fully conductive, a voltage of predetermined value appears across the cathode resistor 284, and when the tube is biased to cutout, no voltage appears across the resistor 284. Accordingly, voltage impulses having a constant amplitude and varying in frequency in accordance with variations in the input voltage as represented by the curve B are developed across the resistor 284. It will thus be seen that the network interconnecting the oscillator output resistor 275 with the input electrodes of the tube 282 functions to prevent the voltage impulses developed across the resistor 284 from varying in magnitude in accordance with the variations in magnitude of the voltage pulses appearing across the resistor 275. This is of importance since it is necessary to apply voltage impulses of a substantially constant amplitude to the ring electrodes 255 and 256 if the current flowing between these electrodes is to be made to vary in accordance with the conductivity of the current path extending therebetween.

As shown in Fig. 9 of the drawings, the output current of the pulse generator traverses a circuit comprising the electrode ring 255, the drilling fluid section 262 adjacent the electrode ring 255, the adjoining portion of the earth's formation which is located predominantly within the region 263, the drilling fluid section 264 and the electrode ring 256. As will be apparent, the geometry of this circuit is such that the resistance of the drilling fluid sections 262 and 264 is small compared to the resistance of the formation through which the current is flowing. Consequently, the resistance of the circuit across the output terminals 260 and 261 of the impulse generator 257 and hence the magnitude of the current traversing this circuit depend substantially entirely upon the conductivity of the formation adjacent the drill tool. Thus the impulse generator 257 receives at its input terminals 258 and 259 the spontaneously generated voltage which varies with curve A of Fig. 11 and delivers its output current to a circuit having conductance equal to that of the adjoining formation and varying in accordance with the curve shown in Fig. 12. The resulting output of the impulse generator consists of current impulses modulated in magnitude and variably spaced with respect to time in the manner diagrammatically shown in Fig. 13(d) of the drawings. By comparing the impulse pattern shown in Fig. 13(d) with the curves of Figs. 11 and 12 it becomes apparent that the current impulses developed by the generator 257 are modulated in frequency in accordance with variations of the spontaneous potential of the formation adjacent the drill tool and are simultaneously modulated in amplitude in accordance with variations in the conductivity of the formation.

The electrode 255 is connected to the positive output terminal of the impulse generator 257 and is made of a radioactive material. Accordingly, when current impulses of the character shown in Fig. 13(d) pass from the electrode 255 into the mud stream, corresponding amounts of radioactive tracer are dissolved in the mud. Each current impulse has a magnitude that is substantially proportional to the conductivity of the adjacent earth formation and causes the release of a "tracer impulse," i. e., a radioactive substance in a determined relatively small amount which is proportional to the magnitude of the current impulse. These tracer impulses are separated by suitable time intervals and succeed each other at a frequency representing the spontaneous potential.

The radioactive tracer impulses are carried by the mud stream to the top of the drill hole and are subsequently detected by means of the measuring apparatus shown in Fig. 14 of the drawings. That portion of this apparatus shown within the dashed line enclosure 264 is identical with the apparatus shown in Fig. 3 of the drawings and accordingly, corresponding elements have been designated by the same reference numerals. However, the detector 90 and ionization chamber of the apparatus shown in Fig. 14 are of the integrating type and therefore a voltage is obtained across the resistor 97 which represents the energy of radiation of the detected tracer substance. The radioactive tracer substance arrives in pulses in accordance with the diagram of Fig. 13(d), and each tracer pulse produces a voltage pulse across the resistor 97 which is proportional in magnitude to the amount of radioactive substance in the tracer pulse. There is thus obtained across the output terminals of the resistor 97 a succession of voltage pulses varying in amplitude and frequency in the manner shown in Fig. 13(d). The voltage pulses thus developed across the resistor 97 are impressed upon the input terminals of a frequency measuring network 265 and a rectifier 267 in parallel.

Like the network 98 shown in Fig. 3 of the drawings, the network 265 develops a voltage at its output terminals which is proportional in magnitude to the frequency of the voltage applied to its input terminals. Thus a voltage is produced across the output terminals of the network 265 which varies in magnitude in accordance with variations in the spontaneous potential of the formation being drilled, i. e., in accordance with curve A of Fig. 11. This voltage is metered by a conventional millivoltmeter 266, which may be scaled to indicate the measured spontaneous potential directly. In combination with a resistor 268 and condenser 269, the rectifier 267 functions to convert the pulsing voltage impressed across its input terminals into a continuous direct voltage having a magnitude which varies in accordance with variations in the amplitude of the pulsing input voltage. This continuous direct voltage is developed across the condenser 269 and metered by a millivoltmeter 270. Thus the millivoltmeter 270 is controlled to indicate the conductivity of the formation being drilled.

While different embodiments of the invention have been described, it will be understood that various modifications may be made therein which are within the true spirit and scope of the invention as defined in the appended claims.

What is claimed is:

1. Apparatus for determining values of one of the characteristics of formations traversed by a drill hole which extends from the earth's surface into the earth, including in combination with a drilling fluid circulating system a rotary drilling tool comprising: a drill collar and a drill bit; means secured near the end of said tool and encased in said drill collar and operative in response to said values for releasing into the fluid traversing said system a tracer substance in an amount representing said values of said characteristic; and measuring means positioned at the earth's surface in the vicinity of said circulating system for measuring the amount of tracer substance in said fluid, thereby to provide an indication representing said values of said characteristic.

2. Apparatus for determining one of the characteristics of a formation traversed by a drill hole which extends from the earth's surface into the earth, including in combination with a drilling fluid circulating system a rotary drilling tool comprising: a drill collar and a drill bit; two electrodes insulated one from the other and secured near the end of said tool in effective electrical contact with the fluid traversing said system, one of said electrodes comprising a tracer releasing substance; a current generator disposed within said drill collar and having its output terminals connected to said electrodes to produce an electrical current flow between said electrodes having a magnitude representing said characteristic, said current flowing from one of said electrodes to the other through a portion of the fluid traversing said system, thereby to release from said one electrode into the fluid traversing said system said tracer substance in an amount representative of said characteristic; and measuring means positioned at the earth's surface in the vicinity of said circulating system for measuring the amount of tracer substance in said fluid, thereby to provide an indication representing said characteristic.

3. Apparatus for determining one of the characteristics of a formation traversed by a drill hole which extends from the earth's surface into the earth, including in combination with a drilling fluid circulating system a rotary drilling tool comprising: a drill collar and a drill bit; two electrodes insulated one from the other and secured to said tool near the end thereof in effective electrical contact with the fluid traversing said system, one of said electrodes comprising a radioactive substance; a current generator disposed within said drill collar and having its output terminals connected to said electrodes to produce an electrical current flow between said electrodes having a magnitude representing said characteristic, said current flowing from one of said electrodes to the other through a portion of the fluid traversing said system, thereby to release from said one electrode into the fluid traversing said system radioactive ions in an amount representing said characteristic; and measuring means positioned at the earth's surface in the vicinity of said circulating system for measuring the radiation of the ions in said fluid thereby to provide an indication representing said characteristic.

4. Apparatus for drilling a bore hole in the earth and for simultaneously exploring the geological formations surrounding said hole, including in combination: a drilling tool; means for circulating drilling fluid in said hole to elevate cuttings from said drilling tool to the earth's surface; an electrolytically dissoluble electrode carried by and insulated from said tool and adapted to make electrical contact with said fluid; a current generator carried by said tool and having its output terminals respectively connected to said tool and said electrode whereby the current output of said generator flows from said electrode into said fluid to electrolytically dissolve material from said electrode in said fluid; means to vary the current output of said generator in accordance with a changing characteristic of said formation, whereby the amount of said electrode material electrolytically dissolved in said fluid is varied correspondingly; and means at the earth's surface for testing said circulating fluid to determine the amount of said dissolved material contained in said fluid and thus obtain a measured indication of said characteristic.

5. Apparatus for drilling a bore hole in the earth and for concurrently determining values of a characteristic of the geological formation surrounding said hole, comprising: a drilling tool; means for circulating drilling fluid in said hole to elevate cuttings from said drilling tool to the earth's surface; means carried by said tool and responsive to the value of said characteristic for releasing radioactive ions into the fluid traversing said system, having a measurable characteristic representative of said value of said characteristic of the geological formation surrounding the adjacent portion of said hole, said ions being elevated to the earth's surface by the drilling fluid traversing said system; and means at the earth's surface responsive to said measurable characteristic of said radioactive ions for producing an indication representative of said value of said characteristic of the geological formation surrounding said adjacent portion of said hole.

6. Apparatus for drilling a bore hole in the earth and for concurrently determining one of the characteristics of the geological formation surrounding said hole, comprising: a drilling tool; means for circulating drilling fluid in said hole to elevate cuttings from said drilling tool to the earth's surface; a neutron source carried by said tool for irradiating the formation cuttings from said drilling tool to produce radioactive isotopes in said cuttings which are carried to the surface of the earth by the said fluid traversing said system; and means at the earth's surface responsive to radiation from said radioactive isotopes for producing an indication representative of said characteristic of the geological formation surrounding the adjacent portion of said hole.

7. Apparatus for drilling a bore hole in the earth and for concurrently determining one of the characteristics of the geological formation surrounding said hole, comprising: a drilling tool; means for circulating drilling fluid in said hole to elevate cuttings from said drilling tool to the earth's surface; means carried by said tool and responsive to changes of said characteristics for intermittently releasing radioactive substance into the fluid traversing said system, at a frequency representative of said characteristic, said radioactive substance being elevated to the earth's surface by the drilling fluid traversing said system; and means at the earth's surface responsive to radiation from said radioactive substance and to the frequency of occurrence of said radioactive substance in the fluid traversing said system for producing an indication representative of said characteristic.

8. Apparatus for drilling a bore hole in the earth and for concurrently determining two different characteristics of the geological formation surrounding said hole, comprising: a drilling tool; means for circulating drilling fluid in said hole to elevate cuttings from said drilling tool to the earth's surface; means carried by said tool and actuated in response to said characteristics for intermittently releasing radioactive substance into the fluid traversing said system at a frequency representative of one of said characteristics and in quantities representative of the other of said characteristics, said radioactive substance being elevated to the earth's surface by the drilling fluid traversing said system; means at the earth's surface responsive to the frequency of occurrence of said radioactive substance in the fluid traversing said system for producing an indication representative of said one of said characteristics; and means at the earth's surface responsive to the quantities of radioactive substance in the fluid traversing said system for producing a second indication representative of the said other of said characteristics.

9. Apparatus for drilling a bore hole in the earth and for concurrently determining one of the characteristics of the geological formation surrounding said hole, comprising: a drilling tool; means for circulating drilling fluid in said hole to elevate cuttings from said drilling tool to the earth's surface; means carried by said tool and actuated in response to said characteristics for releasing a radioactive substance into the fluid traversing said system, having a measurable characteristic representative of said characteristic of the geological formation surrounding the adjacent portion of said bore hole, said substance being elevated to the earth's surface by the drilling fluid traversing said system and having a half life exceeding the time required for the substance to reach the earth's surface and less than the time required for any incremental portion of the drilling fluid completely to traverse said system; and means at the earth's surface responsive to said measurable characteristic of the radioactive substance elevated to the earth's surface for producing an indication representative of said characteristic of the geological formation surrounding said adjacent portion of said hole.

10. Bore hole drilling apparatus including: a drill collar; a pair of spaced-apart electrodes mounted upon said drill collar, at least one of said electrodes being insulated from said drill collar and at least one of said electrodes comprising an electrolytically dissolvable material containing a radioactive tracer material.

11. Bore hole logging apparatus for logging a bore hole in conjunction with a carrier fluid circulating through the hole, including: a pair of spaced-apart electrodes, at least one of which comprises an electrolytically dissolvable material capable of releasing a detectable tracer into said carrier fluid upon the application of a voltage across the electrodes; and voltage supply means for supplying a voltage difference across said electrodes.

12. Bore hole logging apparatus for logging a bore hole in conjunction with a carrier fluid circulating through the hole, including: two pairs of spaced-apart electrodes, at least one electrode of each pair comprising electrolytically dissolvable material capable of releasing a detectable tracer upon the application of voltages across the said electrode pairs while in contact with an electrolytic fluid; and separate voltage supplying means for supplying voltage differences across each one of said pairs of electrodes.

13. Bore hole logging apparatus for logging a bore hole in conjunction with a carrier fluid circulating through the hole, including: a pair of spaced-apart electrodes adapted to be lowered into a bore hole and into electrical contact with said fluid therein, at least one of said electrodes comprising a material containing a detectable radioactive tracer and electrolytically dissolvable into said fluid upon the application of a voltage across the said pair of electrodes while in contact with said fluid; and voltage supply means for supplying a voltage difference across said pair of electrodes.

14. Apparatus for determining the value of a variable physical quantity within a borehole out of which a stream of fluid is flowing, comprising: means located within said borehole and operative in response to said value for releasing into the said stream of fluid within said borehole a tracer substance in an amount varying in a manner representative of said value of said physical quantity; and means positioned at the earth's surface in the vicinity of said stream of fluid flowing out of said borehole responsive to the said varying amount of tracer substance arriving at the earth's surface in said stream of fluid, to provide an indication representative of said value of said physical quantity.

15. Apparatus in accordance with claim 14 in which said tracer substance is radioactive.

16. Bore hole logging apparatus including: a supporting structure adapted to be lowered into a bore hole; a pair of spaced-apart electrodes mounted upon said structure, at least one of said electrodes being insulated from said structure and at least one of said electrodes comprising an electrolytically dissolvable material containing a detectable tracer material.

17. Bore hole drilling apparatus including: a drill collar; two pairs of spaced-apart electrodes mounted upon said drill collar, said electrodes of each pair being insulated from each other, at least one electrode of each said pairs of electrodes being insulated from said drill collar, and at least one electrode of each said pair of electrodes comprising an electrolytically dissolvable material containing a detectable tracer material.

18. Borehole logging apparatus comprising: means for circulating a carrier liquid through the borehole from a subsurface zone to the top of the borehole; means is said subsurface zone for passing an electric current through the carrier liquid in said zone, which current varies in accordance with the value of a borehole quantity to be logged, said current passing means including an electrode in contact with the carrier liquid which electrode is electrolytically dissolvable in said liquid and capable of forming a radioactive tracer substance upon being irradiated by neutrons; a source of neutrons adjacent said electrode; and means responsive to varying quantities of said tracer substance in the liquid for obtaining an indication which is characteristic of the value of said borehole quantity.

19. Borehole logging apparatus for logging a borehole in conjunction with a carrier fluid circulating through the borehole, including: a pair of spaced-apart electrodes adapted to make contact with said carrier fluid, at least one of which electrodes is electrolytically dissolvable in said carrier fluid and comprises material capable of forming radioactive isotopes upon being irradiated by neutrons, and thus is capable of releasing said radioactive isotopes into said carrier fluid upon application of a current across said electrodes; a neutron source in said apparatus adjacent said one of said electrodes; supply means for supplying a current across said electrodes, which current varies in accordance with the value of a borehole quantity to be logged; and means responsive to varying quantities of said radioactive isotopes thus released into the fluid for obtaining an indication which is characteristic of the value of said borehole quantity.

20. Apparatus for determining different characteristics of formations surrounding a bore hole including: supporting structure including a drill bit and drill collar insulated from each other and adapted to be lowered into contact with fluid in a bore hole; a first pair of spaced-apart electrodes mounted upon and insulated from said structure and positioned so that a current flowing from one electrode to the other through said fluid will traverse the adjacent formation, at least one of said electrodes being capable of electrolytically releasing into said fluid a detectable tracer material having certain characteristics, upon the application of a voltage across the said pair of electrodes; a second pair of spaced-apart electrodes insulated from each other and from said first pair of electrodes, at least one of said second pair of electrodes being capable of releasing electrolytically into said fluid, upon application of a voltage across said second pair of electrodes, a detectable tracer having characteristics different from that released from said one of said first pair of electrodes; means for supplying a voltage across said first pair of electrodes; means for supplying a voltage across said second pair of electrodes; and means electrically connected between the drill bit and collar and actuated by the voltage difference appearing therebetween for controlling and varying said last mentioned voltage supplying means in accordance with said voltage difference appearing between said drill bit and collar.

JAN JACOB ARPS.

References Cited in the file of this patent

UNITED STATES PATENTS

| Number | Name | Date |
| --- | --- | --- |
| 1,720,325 | Hackstaff et al. | July 9, 1929 |
| 2,225,668 | Subkow et al. | Dec. 24, 1940 |
| 2,231,577 | Hare | Feb. 11, 1941 |
| 2,263,108 | Stuart | Nov. 18, 1941 |
| 2,335,409 | Hare | Nov. 30, 1943 |
| 2,337,269 | Piety | Dec. 21, 1943 |
| 2,339,129 | Albertson | Jan. 11, 1944 |
| 2,341,745 | Silverman et al. | Feb. 15, 1944 |
| 2,342,273 | Hayward | Feb. 22, 1944 |
| 2,354,887 | Silverman et al. | Aug. 1, 1944 |
| 2,374,197 | Hare | Apr. 24, 1945 |
| 2,468,905 | Warren, Jr. | May 3, 1949 |